United States Patent
Boehlke et al.

(10) Patent No.: US 7,274,754 B2
(45) Date of Patent: Sep. 25, 2007

(54) METHOD AND APPARATUS FOR FREQUENCY DIVISION MULTIPLEXING

(75) Inventors: Kenneth A. Boehlke, Portland, OR (US); Krishnan Palaniswami, Portland, OR (US)

(73) Assignee: Focus Enhancements, Inc., Campbell, CA (US)

( * ) Notice: Subject to any disclaimer, the term of this patent is extended or adjusted under 35 U.S.C. 154(b) by 71 days.

(21) Appl. No.: 10/778,699

(22) Filed: Feb. 12, 2004

(65) Prior Publication Data

US 2004/0160988 A1  Aug. 19, 2004

Related U.S. Application Data

(60) Provisional application No. 60/453,643, filed on Mar. 10, 2003, provisional application No. 60/452,512, filed on Mar. 5, 2003, provisional application No. 60/450,846, filed on Feb. 28, 2003, provisional application No. 60/448,772, filed on Feb. 21, 2003, provisional application No. 60/447,633, filed on Feb. 14, 2003, provisional application No. 60/448,039, filed on Feb. 17, 2003.

(51) Int. Cl.
*H04L 27/20* (2006.01)

(52) U.S. Cl. ............... 375/308; 375/239; 375/279; 375/302; 375/329

(58) Field of Classification Search ............... 370/380; 375/259, 329, 308, 239, 302, 279
See application file for complete search history.

(56) References Cited

U.S. PATENT DOCUMENTS

| | | | | |
|---|---|---|---|---|
| 3,548,341 A | * | 12/1970 | Berry | ............... 331/178 |
| 3,898,589 A | * | 8/1975 | Tustison | ............ 332/113 |
| 4,312,072 A | * | 1/1982 | Vogel | ................ 380/34 |
| 5,561,689 A | * | 10/1996 | Fleek et al. | ........... 375/279 |
| 5,875,212 A | * | 2/1999 | Fleek et al. | ........... 375/329 |
| 6,470,055 B1 | * | 10/2002 | Feher | ................ 375/259 |
| 6,611,493 B1 | * | 8/2003 | Miyashita et al. | ...... 370/208 |

* cited by examiner

*Primary Examiner*—Mohammed Ghayour
*Assistant Examiner*—Erin M. File
(74) *Attorney, Agent, or Firm*—John Smith-Hill; Smith-Hill and Bedell

(57) ABSTRACT

A radio transmitter and receiver arrangement includes a transmitter and a receiver. The transmitter generates an electromagnetic carrier that varies in frequency throughout a channel interval, and modulates the carrier with an information signal during the channel interval, whereby the carrier is modulated both in frequency and in accordance with the information signal during the channel interval. The receiver receives the carrier that is modulated both in frequency and in accordance with the information signal, generates a detection signal that varies in frequency throughout the channel interval, and mixes the carrier and the detection signal to recover the information signal.

20 Claims, 10 Drawing Sheets

METHOD AND APPARATUS FOR FREQUENCY DIVISION MULTIPLEXING

CROSS-REFERENCE TO RELATED APPLICATION

This application claims benefit of U.S. Provisional Application No. 60/447,633 filed Feb. 14, 2003; U.S. Provisional Application No. 60/448,039 filed Feb. 17, 2003; U.S. Provisional Application No. 60/448,772 filed Feb. 21, 2003; U.S. Provisional Application No. 60/450,846 filed Feb. 28, 2003; U.S. Provisional Application No. 60/452,512 filed Mar. 5, 2003; and U.S. Provisional Application No. 60/453,643 filed Mar. 10, 2003; the entire disclosure of each of which is hereby incorporated by reference herein for all purposes.

BACKGROUND OF THE INVENTION

This invention relates to a method and apparatus for frequency division multiplexing.

In several digital modulation techniques, a group of consecutive data bits in an input data stream Di is represented by a symbol. Different combinations of data bits are represented by different symbols. For example, in the case of the group being composed of three bits, there are eight possible combinations and accordingly there are eight different symbols. One common type of digital modulation employing eight symbols is 8-level phase shift keying (8-PSK), in which the eight different symbols induce eight equiangularly spaced values of phase displacement in the bandpass representation.

In the complex baseband representation, each symbol is conventionally represented by a doublet (I, Q). The I and Q components of the symbol are applied to respective ports of a quadrature modulator that also receives a carrier signal and outputs a signal that is modulated in frequency and/or phase and/or amplitude in accordance with the values of the I and Q components.

Orthogonal frequency division multiplexing (OFDM) is a digital modulation technique in which an input data stream is decomposed into several subsidiary streams, each subsidiary stream is represented by a sequence of symbols, and the several sequences of symbols (up to several thousand sequences) are used to modulate respective carriers of constant frequency. The modulated carriers are summed to produce a transmission signal, which is supplied to a transmitter antenna for transmission to a receiver antenna. Receivers equal in number to the carriers and tuned to the carriers respectively receive and detect the sequences of symbols. Each sequence of symbols is then used to recover the corresponding subsidiary data stream, and the subsidiary data streams are combined in order to recreate the original data stream, which may be an HDTV signal. The carriers are sufficiently spaced in frequency that they are orthogonal, i.e. each receiver sees only its own carrier.

SUMMARY OF THE INVENTION

In accordance with a first aspect of the present invention there is provided a radio transmitter that comprises a means for generating an electromagnetic carrier that varies in frequency throughout a channel interval, and a means for modulating the carrier with an information signal during the channel interval, whereby the carrier is modulated both in frequency and in accordance with the information signal during the channel interval.

In accordance with a second aspect of the present invention there is provided a radio receiver for receiving a carrier that is modulated both in frequency and in accordance with an information signal during a channel interval, comprising a first means for generating a detection signal that varies in frequency throughout a channel interval, and a detector means for mixing the carrier and the detection signal and recovering the information signal.

In accordance with a third aspect of the present invention there is provided a radio transmitter that includes a means for receiving an input data word and generating a digital sequence that reflects systematic modulation of a carrier and modulation of the carrier in accordance with the data word.

In accordance with a fourth aspect of the present invention there is provided a radio transmitter that comprises a means for receiving an input data word and generating a digital sequence that reflects systematic modulation of a baseband signal and modulation of the baseband signal in accordance with the data word, and a digital-to-analog converter for converting the digital sequence to analog form at a sample conversion rate such as to generate a bandpass signal that is modulated both systematically and in according with the data word.

In accordance with a fifth aspect of the present invention there is provided a radio transmitter that comprises a means for receiving an input data word and generating a digital sequence that reflects modulation of a carrier both in frequency and in accordance with the data word, and a digital-to-analog converter for converting the digital sequence to analog form.

In accordance with a sixth aspect of the present invention there is provided a radio receiver for receiving a carrier that is modulated both in frequency and in accordance with information content of a digital word, the radio receiver comprising a first means for generating a digital sequence that reflects modulation of a detection signal in frequency, and a digital-to-analog converter for converting the digital sequence to analog form and providing a detection signal, and a detector means for mixing the detection signal and the carrier and recovering the information content of the digital word.

In accordance with a seventh aspect of the present invention there is provided a method of generating an identification code for a transmitter and receiver arrangement, comprising multiplying a first pseudo random sequence of p code chips (bottom code) sequentially by each chip of a second pseudo random sequence of q code chips (middle code) to generate a sequence of p*q code chips in which the sequence of p code chips is reproduced once for each occurrence of a logic high value in the sequence of q code chips, and multiplying the sequence of p*q code chips by each chip of a third pseudo random sequence of r code chips (top code). to generate a sequence of p*q*r ID code chips in which the sequence of r code chips is reproduced once for each occurrence of a logic high value in the sequence of r code chips.

In accordance with an eighth aspect of the present invention there is provided a radio transmitter for transmitting digital data represented as by a menu of symbols, wherein each symbol is characterized by at least one of phase and frequency, comprising a look-up table that stores a digital representation of each symbol, an addressing means for addressing the look-up table in accordance with a group of digital data digits, and a digital to analog converter for converting a selected symbol to analog form.

In accordance with a ninth aspect of the present invention there is provided a radio transmitter and receiver arrangement comprising a transmitter that generates an electromagnetic carrier that varies in frequency throughout a channel interval, and a means for modulating the carrier with an information signal during the channel interval, whereby the carrier is modulated both in frequency and in accordance with the information signal during the channel interval, and a receiver for receiving a carrier that is modulated both in frequency and in accordance with an information signal during a channel interval, comprising a first means for generating a detection signal that varies in frequency throughout a channel interval, and a detector means for mixing the carrier and the detection signal and recovering the information signal.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate like or equivalent components.

DETAILED DESCRIPTION

Figure 1:
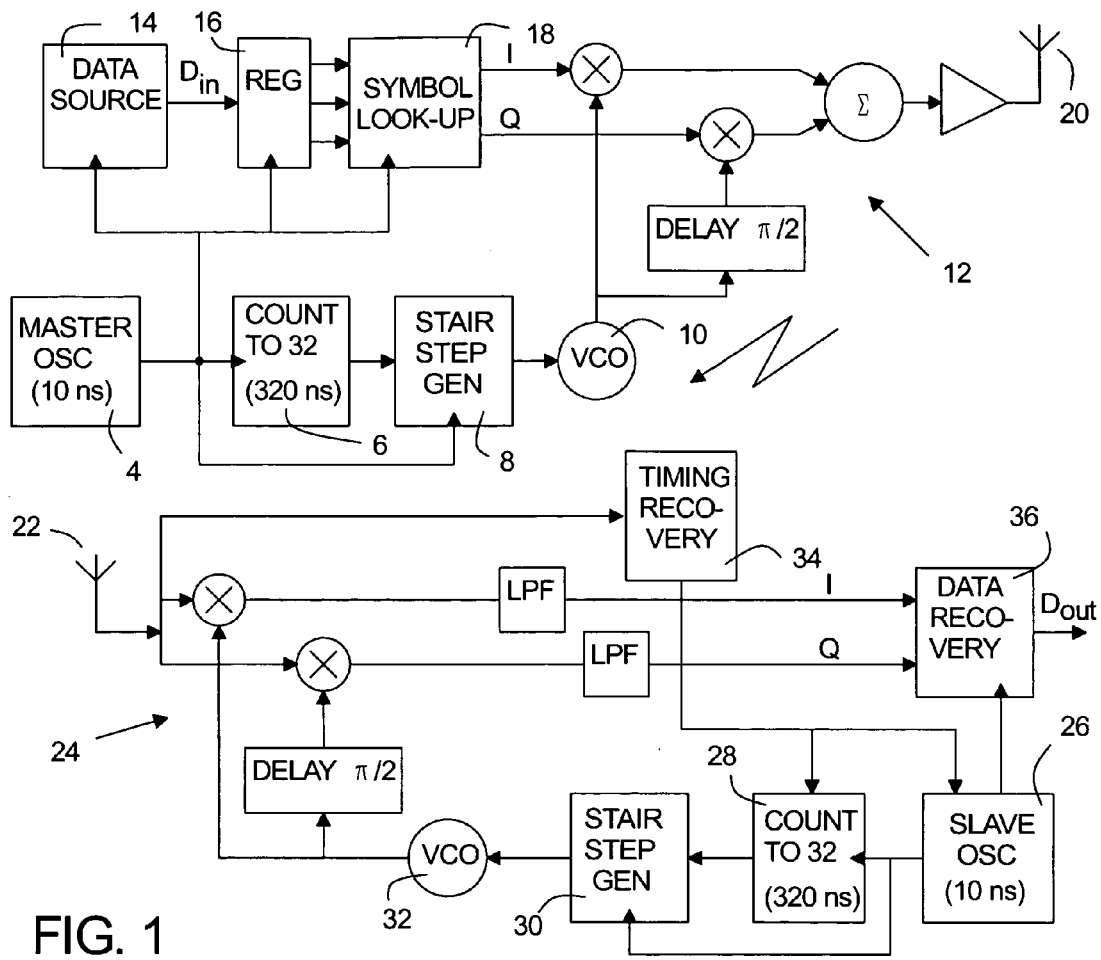
FIG. 1 is a schematic block diagram of a first transmitter and receiver arrangement embodying the present invention.

Referring to FIG. 1, a master clock oscillator 4 generates master clock edges at 10 ns intervals and a counter 6 receives the clock edges and generates control signal edges at 320 ns intervals. The oscillator 4 and counter 6 thus divide the period following each master clock edge into 32 slots of 10 ns each. A stairstep generator 8 generates an output signal having a voltage V that increases by a fixed amount $V_{step}$ in response to each master clock edge and is reset to an initial voltage level V1 in response to each control signal edge. The stairstep output signal of the stairstep generator is applied to the control input of a voltage controlled oscillator 10. For each step of the stairstep signal, the VCO 10 generates a wave segment or wavelet of constant frequency and the frequency of the wave segment depends on the voltage of the output signal of the VCO 10 and hence on the time slot occupied by the wave segment relative to the immediately preceding master clock edge. The output signal of the VCO 10 sweeps stepwise in frequency between 3.2 GHz and 6.4 GHz in steps of 0.1 GHz in accordance with the repetitive stairstep signal. The output signal of the oscillator is applied to the carrier input of a complex modulator 12. In general, for the period t=0 to t=2MT, where T is the duration of each step and 2M is the number of steps, the output signal of the VCO 10 for the time slot from t=iT to t=(i+1)T (i=−M . . . M−1) is described by the following equation:

$$V_{osc} = \cos 2\pi\omega_i t \qquad 1$$

where $\omega_i = \omega_0 + i\omega_{step}$. In the case of the illustrated embodiment, $2\pi\omega_0 = 3.2$ GHz and $2\pi\omega_{step} = 0.1$ GHz. Each of the frequencies $\omega_0 \ldots \omega_{M-1}$ is a communication channel of the transmitter/receiver arrangement. Accordingly, each time slot is a channel interval within the frequency sweep interval.

A data source 14 supplies a binary input data stream $D_{in}$ to a serial in, parallel out register 16 which employs each group of three consecutive bits to address a symbol lookup table 18. Depending on the values of the three consecutive bits, the symbol lookup table selects one of eight doublets (I, Q) and supplies the components I and Q of the selected doublet to the in-phase and quadrature inputs respectively of the complex modulator 12. The bit rate of the input data stream $D_{in}$ is such that one doublet is generated for each step of the stairstep waveform. The output signal of the complex modulator is a signal at the output frequency of the VCO 10 and having one of eight equiangularly distributed values of phase displacement (including zero) relative to the output signal of the VCO 10. Since the frequency of the output signal of the VCO varies in stepwise fashion in accordance with the output signal of the stairstep generator 8, the frequency of the output signal of the complex modulator likewise varies in stepwise fashion.

Figure 2:
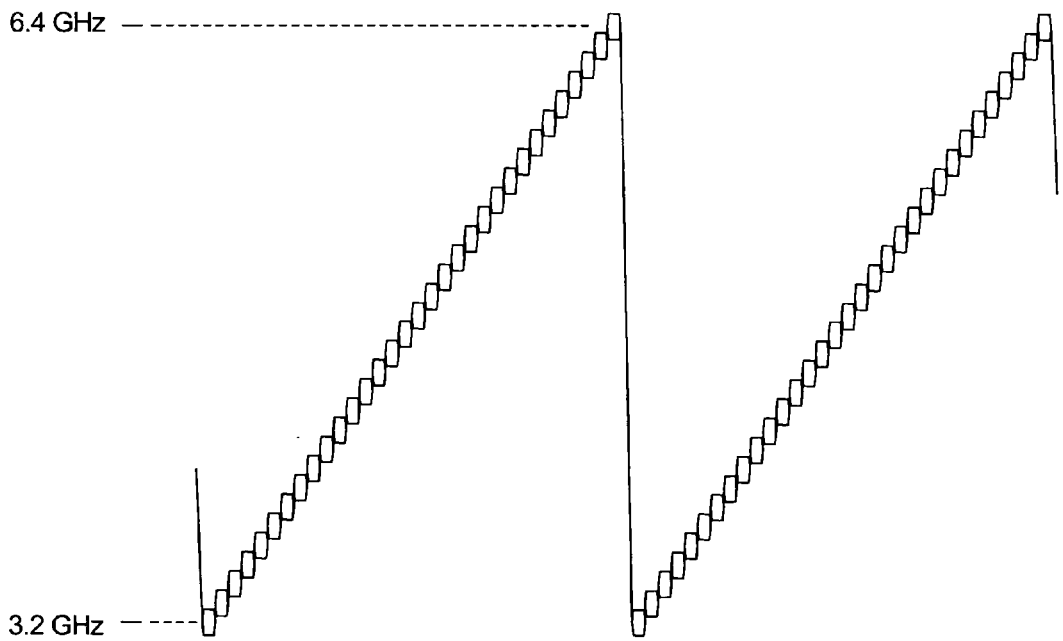
FIG. 2 is a graph illustrating variation in frequency as a function of time.

FIG. 2 illustrates schematically the waveform of the output signal of the complex modulator, and it will be noted that FIG. 2 shows 32 modulation envelopes centered at respective frequencies on the ramp between 3.2 GHz and 6.4 GHz. In the case of FIG. 2, each envelope depicts one of the eight possible values of phase displacement.

Referring again to FIG. 1, the output signal of the complex modulator is applied through an amplifier to a transmitter antenna 20 and a corresponding signal is induced in a receiver antenna 22 and is supplied to a quadrature mixer 24. A slave oscillator 26, a counter 28, and a stairstep generator 30 cooperate in similar fashion to the master oscillator 4, counter 6 and stairstep generator 8 of the transmitter and generate a stairstep signal that is applied to the control input of a VCO 32. Thus, the output signal of the VCO 32 varies stepwise in frequency between 3.2 GHz and 6.4 GHz in steps of 0.1 GHz. A timing recovery circuit 34, the operation of which will be described in greater detail below, from time to time resets the slave oscillator 26 and counter 28 so that they are synchronized with the master oscillator 4 and counter 6.

The timing recovery circuit 34 also supplies timing signals to the data recovery circuit 36, which uses these signals to recover the symbols and generate an output data stream $D_{out}$ matching the input data stream $D_{in}$.

Because the different wave segments are spaced in frequency and do not overlap in time, they are orthogonal and there is no ambiguity in translating a bit from the input data stream to the output data stream. Further, because each wave segment occupies only 10 ns of the 320 ns period following each master clock edge, the average power level at the frequency of any of the wave segments is low.

In a preferred implementation of the invention, the carrier frequency does not change stepwise, as described with reference to FIGS. 1 and 2, but increases (or decreases) linearly in frequency over a frequency sweep interval. The frequency sweep interval is divided into multiple channel intervals, and in each channel interval the phase of the carrier is set to a selected value corresponding to a symbol that is to be transmitted. If the number of channel intervals is 2M, the kth symbol is transmitted in the mth channel interval, and each symbol is synthesized from N samples, the ideal or prototype waveform of the modulated carrier may be represented by two interleaved sequences Isymbol (n, m, k) and Qsymbol (n, m, k):

$$Isymbol(n, m, k) = A_{k,m} \cdot \left[ AW_n \cdot \cos\left[ \frac{\pi}{2 \cdot N \cdot M} \cdot n^2 + \frac{\pi}{m} \cdot \left(m + \frac{1}{2}\right) \cdot n + \pi \cdot n + A\Phi_{k,m} \right] \right]$$

$$Qsymbol(n, m, k) = B_{k,m} \cdot \left[ BW_n \cdot \sin\left[ \frac{\pi}{2 \cdot N \cdot M} \cdot n^2 + \frac{\pi}{m} \cdot \left(m + \frac{1}{2}\right) \cdot \left(n + \frac{1}{2}\right) + \pi \cdot n + B\Phi_{k,m} \right] \right]$$

where:
$A_{k,m}$, $B_{k,m}$=amplitude modulation of symbol k in channel m,
$A\Phi_{k,m}$, $B\Phi_{k,m}$=phase modulation of symbol k in channel m,
$AW_n$, $BW_n$=symbol windowing function,
N=length of the symbol in samples,
n=sample index of symbol,
M=number of single sideband channels at the quadrature sample rate of the system, and
m=channel index of the system ($-M \leq m < M$).

In the preferred implementation of the invention, there is no amplitude modulation and the phase modulation is 8-level phase shift keying, M is equal to 16, and each symbol is represented by 32 I sample values and 32 Q sample values.

Each of the 2M channels in one frequency sweep interval can have one of K values of phase displacement, and each wave segment is composed of N sample values.

In accordance with the modification shown in FIG. 3, a timing generator 40, which may comprise an oscillator and counter as described with reference to FIG. 1 or functionally equivalent means for generating appropriate timing signals, triggers a sawtooth generator 44 at intervals of 320 ns and consequently the voltage of the output signal of the sawtooth generator increases linearly from the initial value V1 over a period of 320 ns and then returns instantaneously to the initial value V1. The output signal of the sawtooth generator 44 is applied to the control input of the VCO 10, which generates an output signal that increases linearly in frequency from 3.2 GHz to 6.5 GHz over each interval of 320 ns between consecutive triggers of the sawtooth generator 44. Each of the 32 frequency intervals, e.g. from 3.2 GHz to 3.3 GHz, is a communication channel of the transmitter/receiver arrangement shown in FIG. 3. The different channels, being limited in time as well as frequency, are limited to respective channel intervals or time slots within the frequency sweep interval.

As in the case of FIG. 1, the symbol lookup table outputs values of I and Q that are supplied to the complex modulator 12 and the complex modulator provides an output signal that is modulated in phase in accordance with the symbol represented by the values of I and Q. However, unlike the case of FIG. 1, the carrier frequency increases linearly rather than stepwise.

Analog-to-digital converters (ADCs) 46I, 46Q receive the analog output signal U, V of the quadrature mixer 24 and convert the signal to digital form. The timing recovery circuit 34 extracts timing information from the antenna signal and controls the operation of the timing generator 48 to synchronize the sawtooth generator 52 with the sawtooth generator 44. The data recovery circuit 50 demodulates the signal U, V in order to recover the values of I and Q and demaps the symbol represented by the doublet (I, Q) and outputs the corresponding sequence of three data bits.

Figure 3:
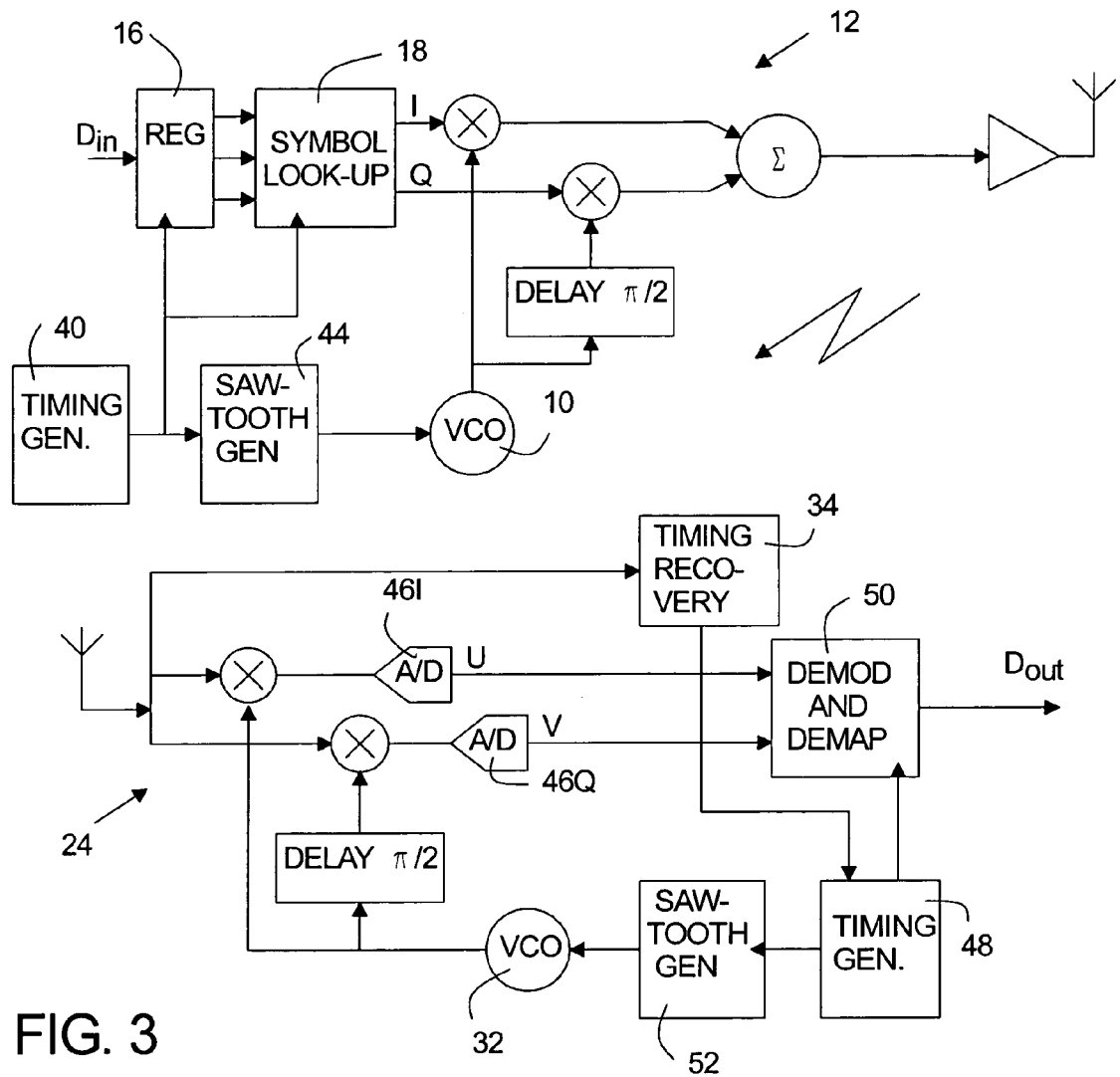
FIG. 3 is a schematic block diagram illustrating a second embodiment of the present invention.

Although the analog implementation shown in FIG. 3 of the complex modulator 12 and quadrature mixer 24 is functional, it is preferred that the modulation and demodulation be accomplished in the digital domain, since digital circuitry may save power and provide easier implementation. The transmitter and receiver shown in FIG. 4 may each be implemented on a single CMOS chip.

Figure 4:
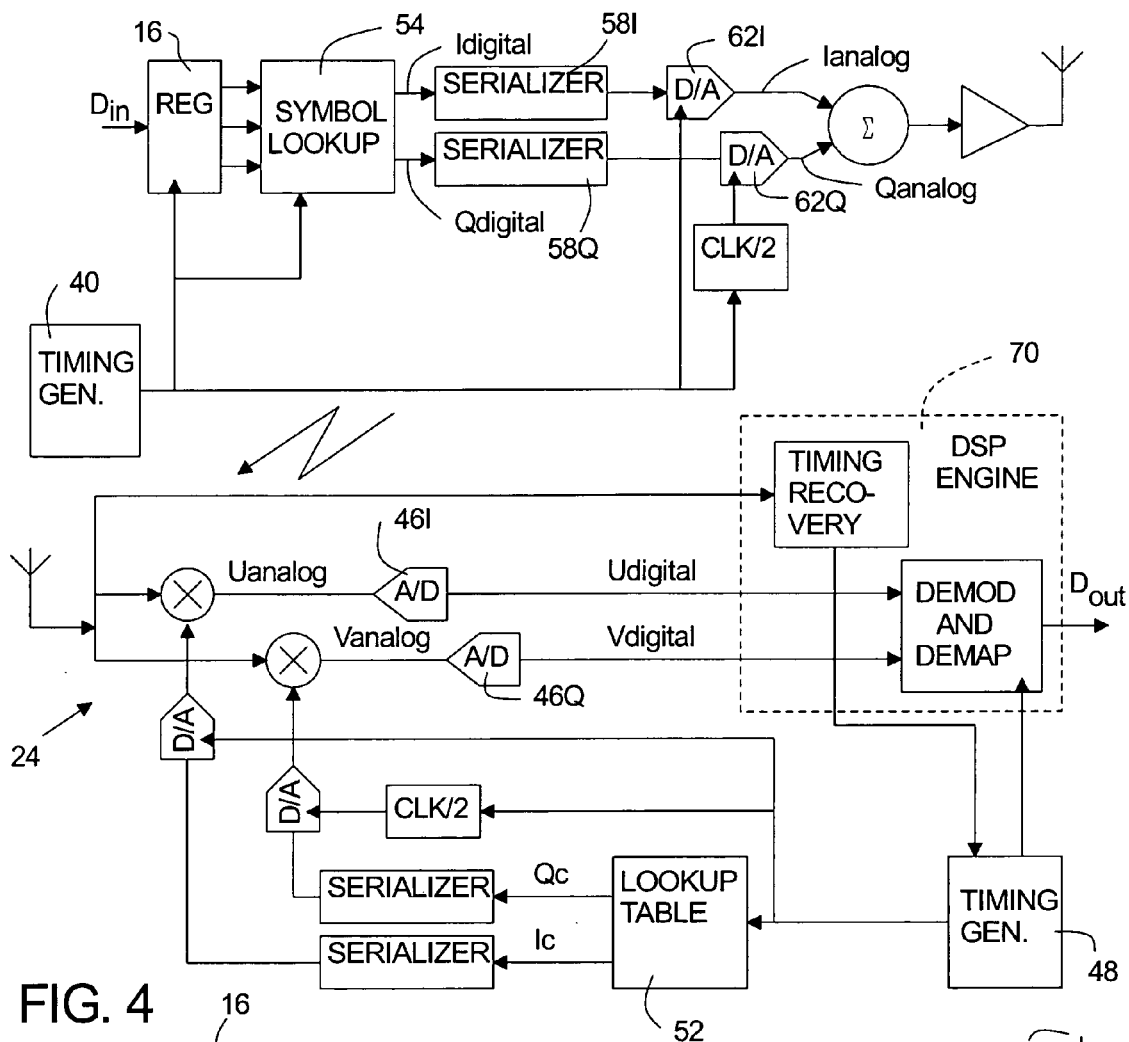
FIGS. 4–7 are block diagrams illustrating further embodiments of the present invention.

In the case of FIG. 4, the timing generator generates a sample conversion clock signal having a frequency Fclk of 3.2 GHz and also generates pulses for clocking the data bits into the register 16 and a five-bit signal that is incremented at intervals of 10 ns. FIG. 4 illustrates a symbol mapping table 54 that is addressable by an address of the form (channel, data). The channel portion of the address is provided by the timing generator 40 whereas the data portion is provided by a group of three consecutive data bits in the input data stream Din. At each addressable location, the table 54 stores a word Idigital and a word Qdigital. The words Idigital, Qdigital stored at the location (channel_m, data_k) are each read out in bit-parallel form at the start of channel interval m in response to data bits that map to the symbol k and are converted to respective sequences of 32 two-bit words by serializers 58I and 58Q. Each serializer outputs the appropriate sequence of 24 two-bit words at uniform intervals during the channel interval m. The sequences of digital words are applied to respective DACs 62 that convert the digital words to analog form under control of the sample conversion clock signal. Each two-bit word has one of three legal values. Depending on its value, each two-bit word received by a DAC is converted to a positive voltage pulse (+1), a negative voltage pulse (−1), or no pulse at all (0). The conversion times of the DAC 62Q are delayed by half a clock cycle relative to the DAC 62I and accordingly the output pulse sequences of the two DACs are mutually offset in time. Since the conversion times of the two DACs are interleaved, the quadrature DACs have an effective combined sample conversion rate of 6.4 GHz. The two mutually offset pulse sequences $I_{analog}$ and $Q_{analog}$ are combined by an output summer and applied to the transmitter antenna 20, which also serves as a reconstruction filter and transmits the appropriate modulated carrier signal.

It will be understood that the spectrum of the output signal of each DAC 62 includes upper and lower sidebands centered on odd multiples of Fclk/2. If, for example; the fundamental frequency component of the pulse sequence applied to each DAC during a channel interval decreases linearly over the channel interval from 1.6 GHz to 1.5 GHz, the lower sideband centered on the frequency 3Fclk/2 (4.8 GHz) will increase linearly in frequency from 3.2 GHz to 3.3 GHz. The phase of the output signal of the summer will depend on the respective phases of the fundamental frequency components of the two pulse sequences. Accordingly, by adjusting the frequency components of the pulse sequences applied to the DACs while keeping the conversion rate constant, the two sidebands centered on 4.8 GHz provide the desired linear increase in carrier frequency from 3.2 GHz to 6.5 GHz.

Figure 5:
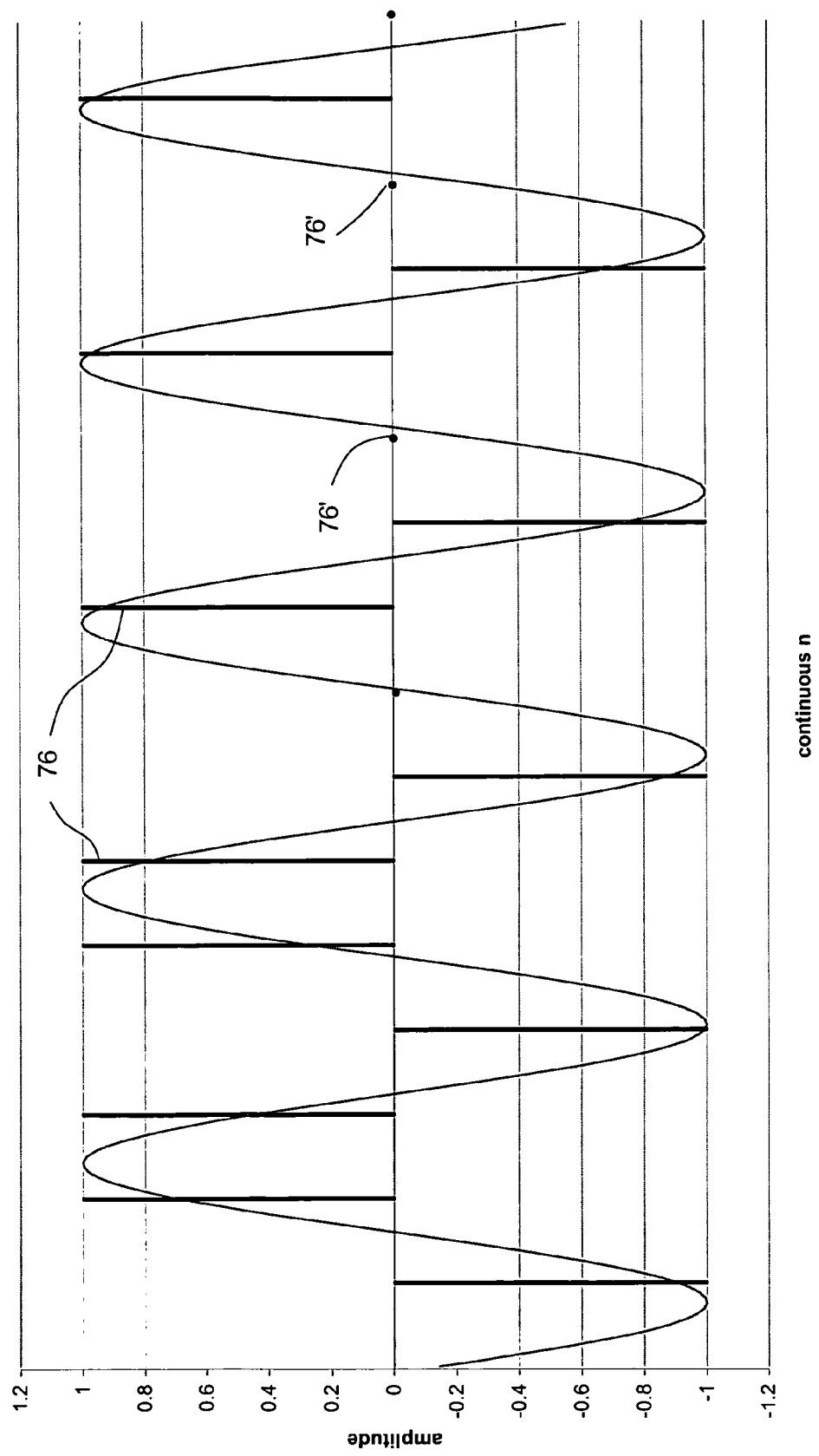

If, for example, the quadrature modulator implements 8-level phase shift keying as discussed above, the fundamental component of the signal supplied by the in-phase arm to the output summer during a symbol interval might be a slightly swept sine wave 66 as shown in FIG. 5. The fundamental component of the signal supplied to the output summer by the quadrature arm is a sine wave that is related in phase to the sine wave 66 such that the output signal of the summer is a sine wave having the desired phase relative to the output signal of the DAC 62I.

At the receiver, the timing generator 48 is synchronized with the transmitter timing generator 40 and addresses a table 52 that outputs a pair of words Ic and Qc for each time slot. The words Ic and Qc correspond to the words stored in the table 54 except that they do not include a term that is dependent on k. As in the case of the transmitter, these bit parallel words are converted to sequences of two-bit words by serializers and the two-bit words are converted by quadrature DACs to sequences of pulses. The two sequences of pulses are reconstructed and the resulting swept sinusoidal analog signals are mixed with the receiver antenna signal and generate signals Uanalog and Vanalog that are converted to digital form and supplied to a DSP engine 70 that implements a timing recovery function and a demodulation and demapping function. The DSP engine demodulates the signals Udigital and Vdigital and recovers the values I, Q and demaps the symbol and outputs the corresponding data bits Dout, which match the data bits Din. The DSP engine also supplies control signals to the timing generator 48 to preserve synchronism with the transmitter timing generator 40.

Although the signals that are supplied to the DACs 62 in the case of FIG. 4 are composed of two-bit words, it will be appreciated that in another implementation it might be necessary or desirable for the words that are supplied to the DACs 62 to have more than two bits or to have only one bit.

It will be appreciated that for each of the 32 time slots that occur during one frequency sweep interval, there are eight possible values of phase displacement of the swept sinusoidal carrier signal. Thus, a wave segment supplied to the transmitter antenna can assume 8*32, or 256, different waveforms.

Figure 6:
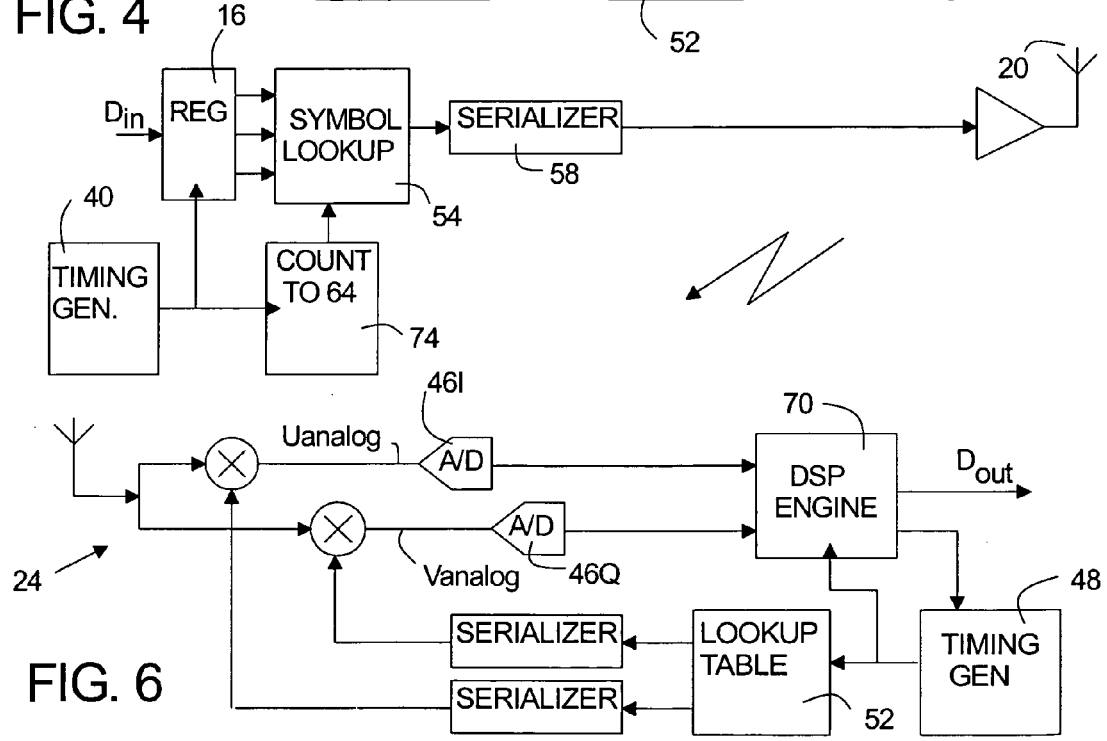

In accordance with FIG. 6, the timing generator 40 increments a five bit counter 74 for each channel interval of the frequency sweep interval of the ramp signal and the five bit output of the counter and the three bit output of the register 16 are used to address a lookup table that stores a data set representing 64 ternary values at each of its 256 addressable locations. The 64 ternary values may be stored as respective two-bit words each having three legal values corresponding to +1, 0 and −1 respectively. The data set at a selected addressable location is read from the lookup table and applied to a serializer that outputs a sequence of 64 voltage pulses (−V volts, 0 volts, +V volts) corresponding to the sequence of 64 ternary values (−1, 0, +1) represented by the data set. The serializer supplies the voltage pulses to an amplifier, which drives the transmitter antenna 20. Thus, for each of the 32 possible output values of the counter, corresponding to the successive channel intervals during one frequency sweep interval, the lookup table stores eight data sets, corresponding respectively to the eight possible waveforms of the wave segment during the channel interval, and one of these data sets is selected on the basis of the three-bit data value provided by the register 16. The transmitter antenna reconstructs the swept sinusoidal waveform that is represented by the sequence of voltage pulses provided by the serializer. The channel intervals are all of equal duration and the wave segment in each channel interval is represented by the same number of samples (64) but the pattern of the pulses is selected so that the wave segment has the appropriate waveform, depending on the frequency range and phase displacement of the waveform.

In the receiver, the timing generator 78 increments a five bit counter synchronously with the timing generator 40 and the five bit output of the counter is used to address a lookup table 82 that stores a data set representing two groups of 32 ternary values at each of its 32 addressable locations. In similar fashion to the operation of the transmitter, the data set at a selected addressable location is read from the lookup table 82 and the two groups of 32 ternary values are applied to respective serializers. Each serializer outputs a sequence of 32 voltage pulses (−V volts, 0 volts, +V volts) corresponding to the sequence of ternary values that it receives. The voltage pulses supplied by the serializers are reconstructed and supplied to the quadrature mixer. The waveforms derived from the two sequences of voltage pulses are slightly swept sinusoidal waveforms offset in phase by 90°. The DSP engine 86 controls the timing generator and counter so that addressing of the lookup table 82 is synchronized with addressing of the lookup table 54. As the 32 data sets are read consecutively from the lookup table 82, the resulting concatenated wave segments provide the desired input signals to the quadrature mixer.

It will be appreciated that it would be possible to employ two lookup tables, each of which stores 32 two bit words at each of its addressable locations and to delay one sequence of voltage pulses by half a sample period relative to the other sequence, in order to achieve the desired effective sample conversion rate in a different fashion.

It will thus be seen that in the case of FIG. 3, the transmitter receives a frequency modulated carrier and modulates the carrier in phase in accordance with symbols derived from the input data whereas in the case of FIG. 4, the input digital data is used to derive data words that represent the evolution with time of a baseband signal having the desired frequency and phase modulation and a bandpass signal having the desired frequency and phase modulation is created by converting the data words to analog form using a DAC that operates with the proper conversion rate. The data words may be derived by use of lookup tables, as described, or by digital calculation. The arrangement shown in FIG. 6 shifts the combining of the frequency and phase information further upstream by deriving a digital representation of the desired wave segment directly from the symbol and the location of the channel interval within the frequency sweep interval.

FIG. 6 shows the direct method for generating the bandpass signal suitable for transmission. This does not preclude further frequency translations or baseband to bandpass conversion schemes to generate the transmission signal.

Figure 7:
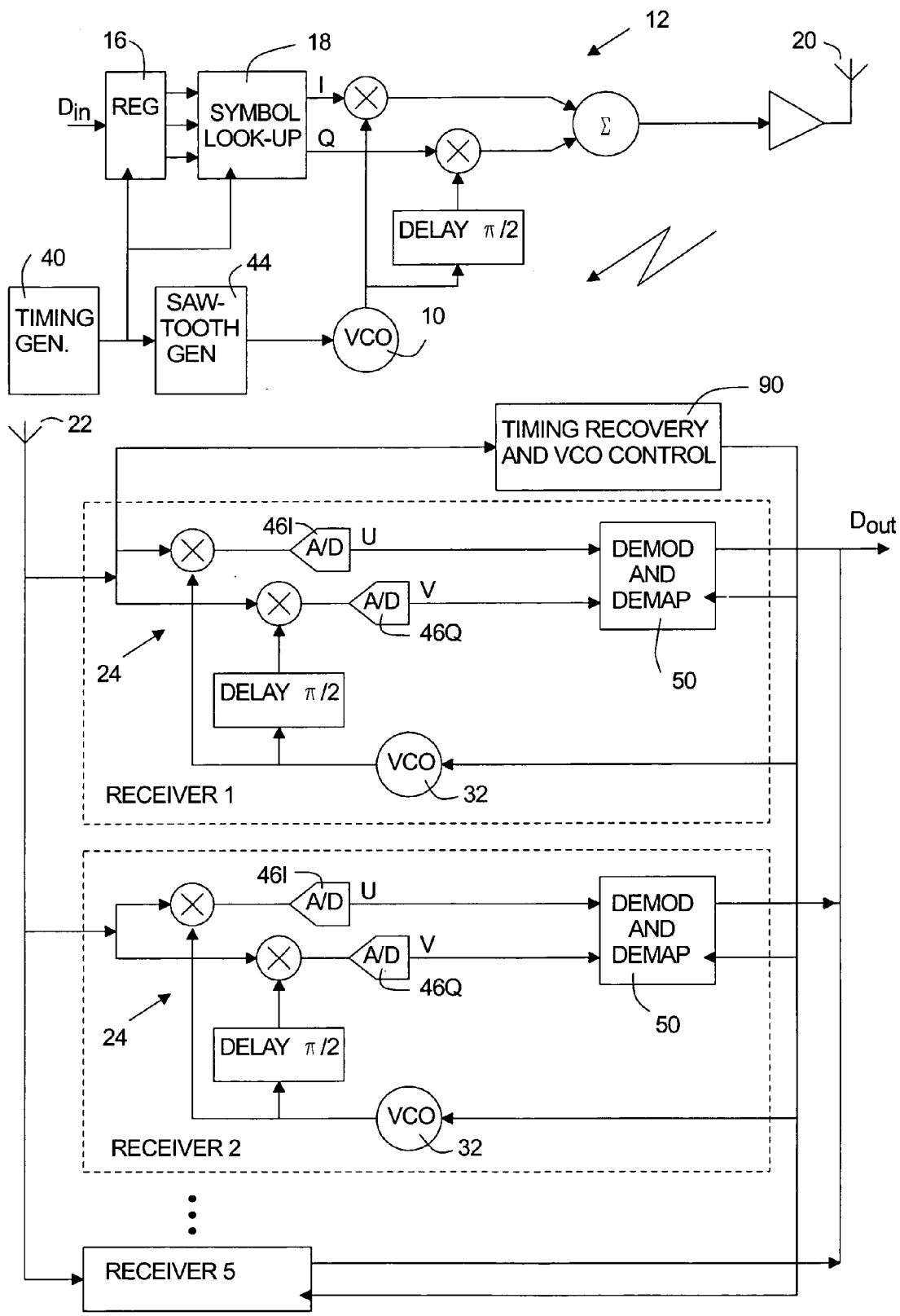

The embodiments that have been discussed so far are designed on the assumption that the intervals during which the successive wave segments are received at the receiver antenna do not overlap in time. Accordingly, the receiver shown in FIG. 1, for example, is able to receive all the signal energy at 3.2 GHz before the stairstep signal generator increases the frequency of the VCO 30 to detect signal energy at 3.3 GHz. However, in the case of a typical implementation of the invention, such as a short range indoor transmitter and receiver for video data, there are multiple propagation paths between the transmitter antenna and receiver antenna and multipath delays will result in multiple channels (each with a separate symbol) being in flight at the same time so that energy of a wave segment in a first channel may be received concurrently with energy of a wave segment in a second channel. In a multipath environment, the receiver should dwell on the first channel from the beginning of the reception interval of the path with the shortest delay until the end of the reception interval of the path with the longest delay in order to maximize detection of signal energy in the first channel. The receiver must therefore include multiple herodyne and demodulation receiver sections. One approach would be to use 2M separate heterodyne and demodulation receiver sections. However, this would be inefficient and it is preferable to employ multiple (but fewer than 2M) receiver sections that are activated sequentially and cyclically. FIG. 7 depicts an implementation in which the receiver antenna 22 is connected to five receiver sections.

The receiver sections shown in FIG. 7 are based on the embodiment shown in FIG. 3. Thus each receiver section includes a quadrature mixer 24 driven by a VCO 30. The output signals of the ADCs 46 are supplied to a demodulating and demapping circuit 50. A common timing recovery and VCO control circuit 90 generates timing signals to control operation of the demodulating and demapping circuits of the five receiver sections respectively and generates five stairstep signals to control operation of the five VCOs respectively. The waveforms of the stairstep signals are such that the VCO of receiver section 1 operates at a suitable frequency for demodulating channel 0 during the time slots of channels 0–5 and then switches to the frequency for channel 6 and remains at that frequency during the time slots of channels 6–11. Similarly, the VCO of receiver section 2 is tuned to the frequency for demodulating channel 1 during the time slots of channels 1–6 and then switches to the frequency of channel 7. In general, in the case of there being P receiver sections, the receiver sections overlap in time by an amount that is equal to (P−1) time slots. The receiver section that is selected to detect the energy of channel m in a given frequency sweep interval remains tuned to channel m from the beginning of channel m until the end of channel m+(P−1). In this manner, the receiver is able to detect the multipath energy. Use of digital signal processing techniques allows the demodulator and demapping circuits to recover phase information from the multipath energy and increase the signal-to-noise ratio.

FIG. 7 shows an implementation that includes five receiver sections. However, there could be more or less than five receiver sections in a practical implementation of the invention.

FIG. 7 shows separate demodulating and demapping circuits 50 for the five receiver sections respectively. However, the demodulating and demapping functions may be performed by a single DSP engine.

Figure 8:
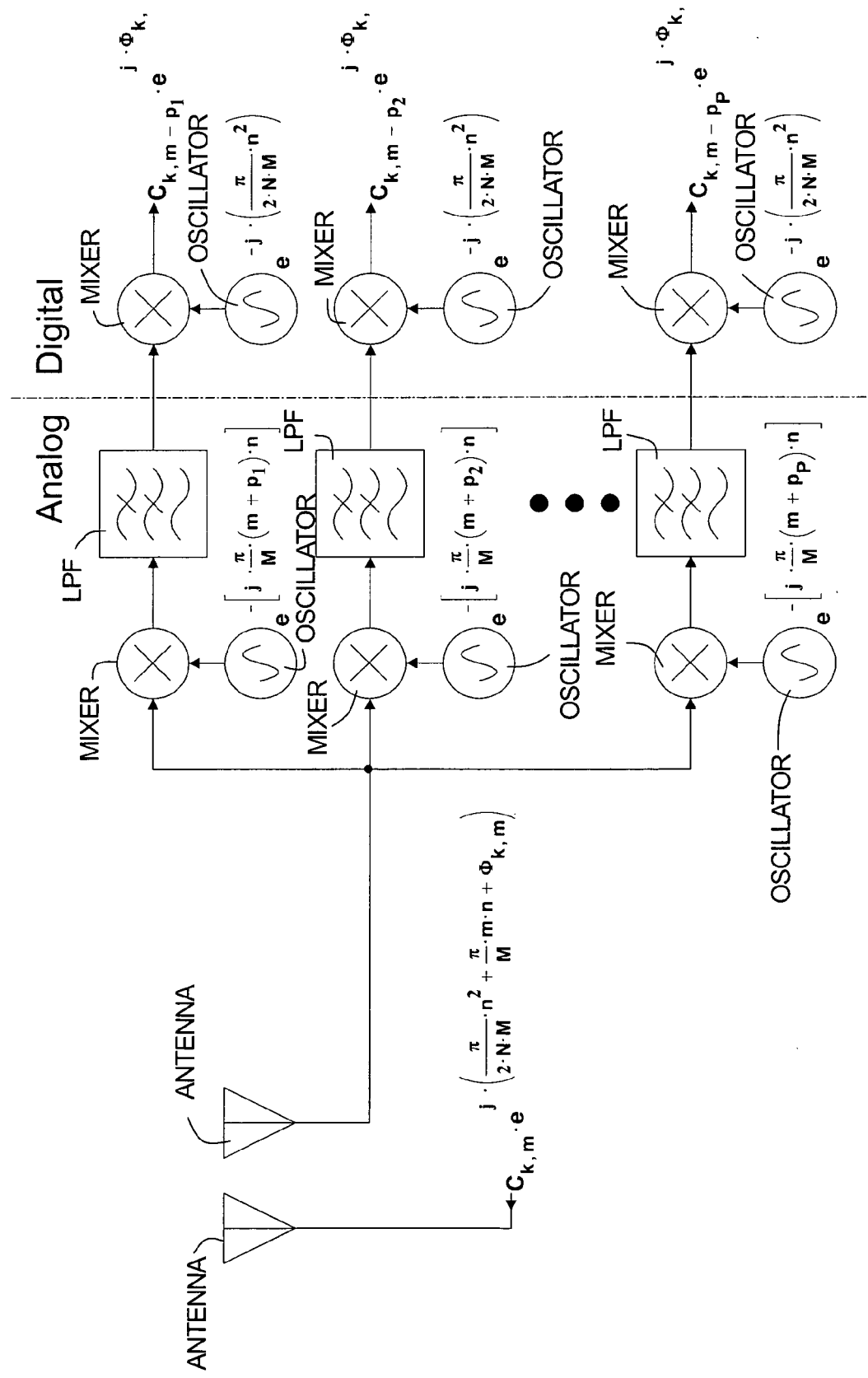
FIGS. 8 and 9 illustrate schematically techniques for recovering multipath signal energy.
Figure 9:
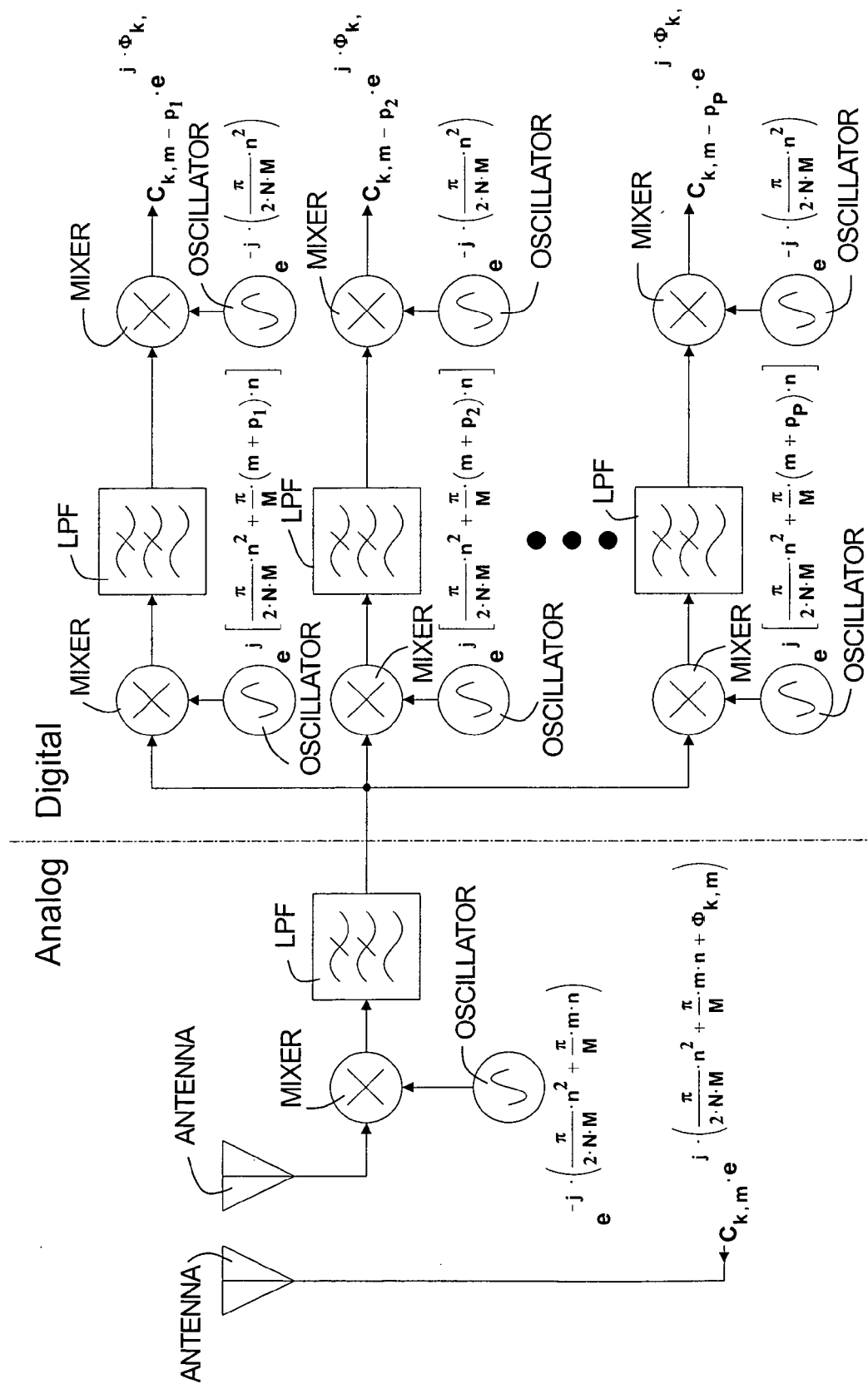

FIG. 8 shows schematically an implementation in which P (at least three) analog receiver sections are actuated sequentially and cyclically. The P receiver sections are identical, and the first mixer of the pth section (p=1 . . . p) receives a mixing signal at a frequency that depends on the value of p. FIG. 9 shows an implementation that requires only one analog receiver section and in which the mixing with a signal at a frequency that depends on the time slot is accomplished in the digital domain.

The radio transmitter and receiver arrangements described above may be used to implement a piconet in which data is transmitted and received among several devices. Since the spatial domain of a given piconet may overlap the spatial domain of another piconet, it is necessary that a receiver in one piconet should be able to identify data transmitted by a transmitter in its own piconet and should ignore data transmitted by transmitters in other piconets. In addition, it is necessary that a receiver should be able to recover with a high degree of reliability the data that it identifies as having been transmitted by a transmitter in its own piconet. Further, since a piconet may include several transmitters, it is necessary to avoid collision between data transmitted by multiple transmitters in the same piconet.

In order to accomplish these goals, the transmitters transmit data in packets and each piconet is assigned a unique identifying code (ID code) that is used by all the transmitters in the piconet to label the packets that they transmit. The ID codes allow a receiver to detect only the packets that are transmitted by transmitters in the piconet of which it is a member. In addition, each piconet includes an arbitrator that assigns time slots to the different transmitters in the piconet.

Figure 10:
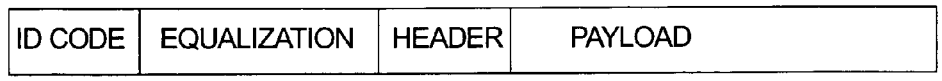
FIG. 10 is a schematic illustration of the format of a data packet that is transmitted using a transmitter arrangement embodying the present invention.

Referring to FIG. 10, each packet is composed of the ID (or sync) code, an equalization sequence, a header, and payload. The equalization sequence provides an a priori symbol sequence to the receiver for sounding the multipath environment and for fine timing adjustment. The header contains data, such as the length of the packet, the nature of the payload, the identity of the transmitter and the identity of the intended receiver. As indicated above, the ID code is unique to the piconet that contains the transmitter.

Figure 11:
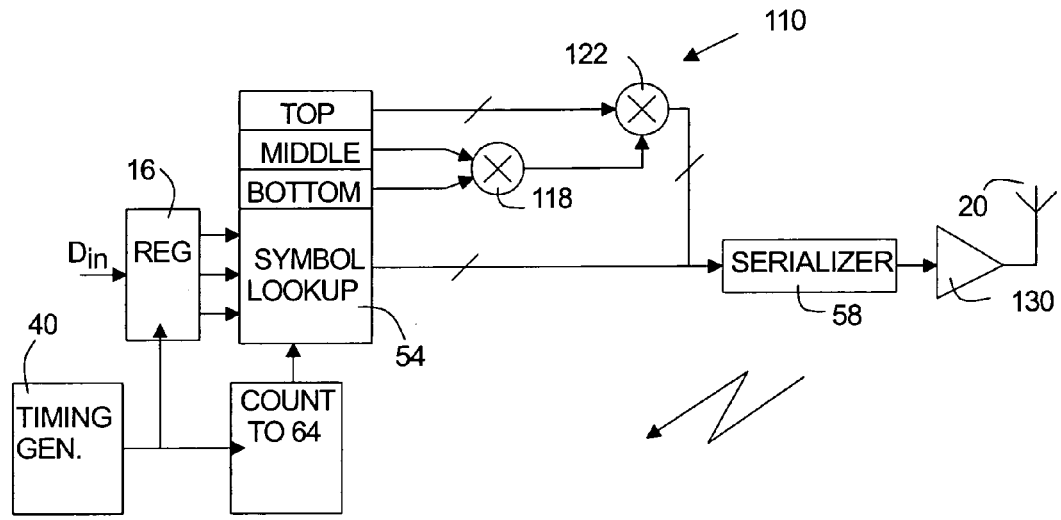
FIGS. 11 and 12 are schematic block diagrams illustrating further embodiments of the present invention.
Figure 11:
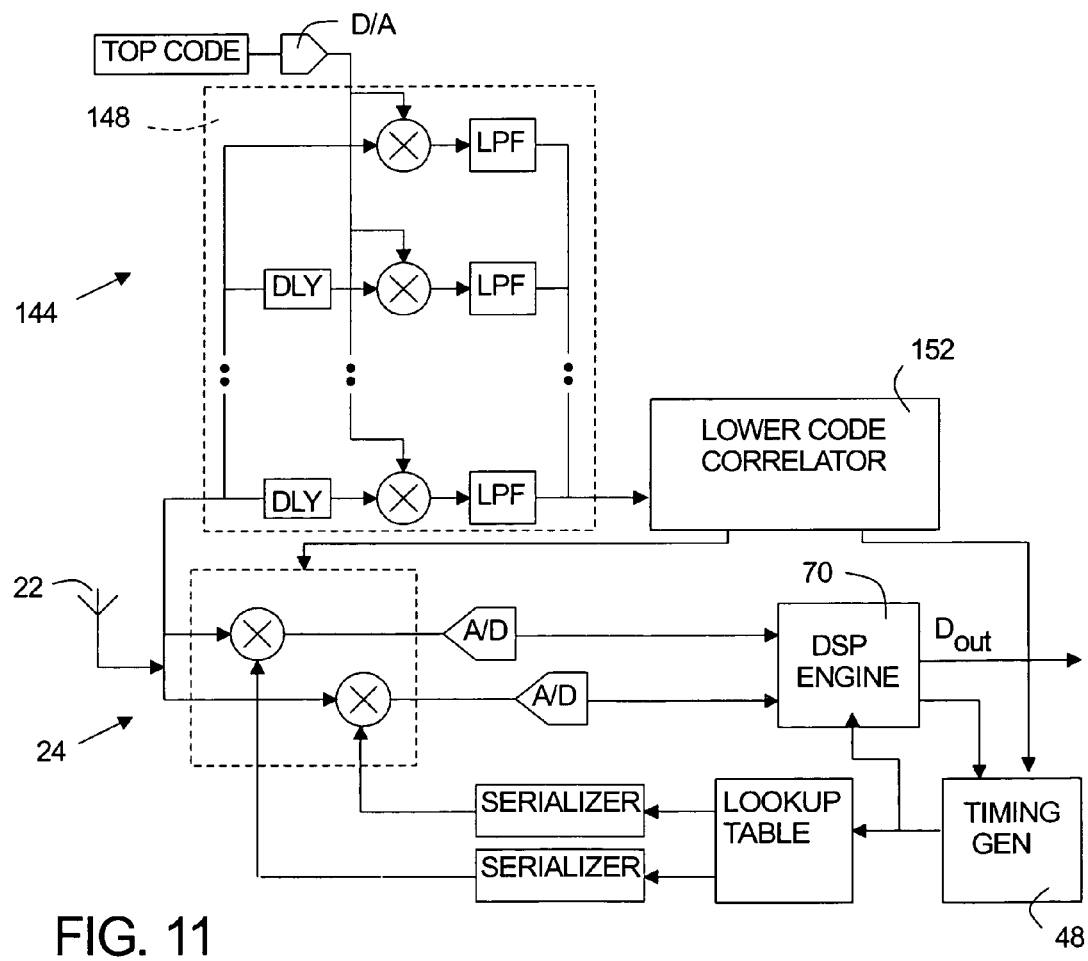

The transmitter shown in FIG. 11 is based on the architecture shown in FIG. 6. A controller (not shown) controls the sequence of operations executed by the transmitter so that for each packet of data (header plus payload) that is to be transmitted, the transmitter first assembles and transmits the ID code and then transmits the data. The data is transmitted starting at a precisely defined time relative to the ID code.

The transmitter includes a PN (pseudo-random number) generator 110 that generates the ID code for the piconet. The lookup table 54 not only stores the symbols corresponding to the various possible sequences of data bits but in addition stores three codes (referred to herein as the bottom code, the middle code and the top code). For convenience, all three codes are referred to herein as binary codes, but the bottom and middle codes may be ternary codes. The PN generator comprises a first multiplier 118 that multiplies the bottom code by the middle code and a second multiplier 122 that multiplies the product of the bottom and middle codes by the top code, as described more fully below. It will be understood that the top code spreads the middle code and the middle code spreads the bottom code. The output of the second multiplier 122 is the piconet's ID code, which is supplied to the serializer 58. In a practical implementation of the invention, the bottom code has 31 binary chips, the middle code 64 binary chips and the top code 16 binary chips. Forming the ID code by multiplying three shorter codes rather than using a another technique is favorable with respect to the number of add operations that must be performed.

Each transmitter and receiver in the piconet stores the same top, middle and bottom codes and therefore each generates the same ID code. Although the top, middle and bottom codes are composed of binary digits, for arithmetical processing the logic high and logic low values map to +1 and −1 respectively rather than 1 and 0, such that, for example, logic low multiplied by logic low returns logic high, not logic low. Thus, the codes are antipodal codes and the corresponding voltage pulses provided by the serializer 58 are +V volts and −V volts.

In a preferred embodiment of the invention, the bottom code is unique to the piconet and the middle code is unique to the piconet. The top codes need not be unique to the piconet and in fact the same top code may be used for all piconets. Preferably, the bottom codes of the different piconets are orthogonal (meaning that the different codes, assigned to the piconets respectively, have low commonality) and the middle codes of the different piconets are orthogonal.

The timing generator 40 controls the PN generator 110 to supply the ID code to the serializer 58 immediately before the symbol lookup table provides the data (header and payload) for a packet.

For each packet that is to be transmitted, the 31 bottom code chips are supplied to a first input of the first multiplier 118 at a rate $R_{bottom}$ and the middle code bits are supplied to a second input of the multiplier 118 at a rate $R_{middle}$, which is equal to $R_{bottom}*64$. During each period $1/R_{bottom}$, the first multiplier multiplies one chip of the bottom code by each of the 64 chips of the middle code and supplies a sequence of 64 intermediate chips, at a rate $R_{middle}$, to a first input of the second multiplier 122. Thus, the first multiplier provides a sequence of 31*64 intermediate chips. Depending on whether the bottom code chip is +1 or −1, each of the 31 sequences of 64 intermediate chips either matches, or is the inverse of, the middle code. The sequence of 31*64 intermediate chips is referred to herein as a lower code.

The 16 top code chips are read out from the lookup table in parallel and are supplied to the second multiplier 122. During each period $1/R_{middle}$, the second multiplier multiplies one chip of the lower code by each of the 16 chips of the top code and supplies 16 ID code chips in parallel to the serializer. Depending on whether the lower code chip is +1 or −1, each of the 31*64 groups of 16 ID code chips either matches, or is the inverse of, the top code. The serializer converts the (31*64) groups of 16 ID code chips to serial form and provides a sequence of 31,744 (31*64*16) chips, forming the ID code, at a rate $R_{middle}*16$.

Let us consider two piconets defined by the ID codes ID1 and ID2. Each ID code may be considered to be a channel. Even thought the two piconets share the same top channel, they are in different subchannels.
Top code ID1=Top code ID2
Middle code ID1≠Middle code ID2
Bottom code ID1≠Bottom code ID2

All autocorrelations of the top, middle and bottom codes are equal to 1; let us assume that all crosscorrelations are equal to 1/30. The autocorrelation of ID1 is equal to 1 and the autocorrelation of ID2 is equal to 1. The crosscorrelation of ID1 and ID2 is equal to the product of the crosscorrelation of the top codes, the crosscorrelation of the middle codes and the crosscorrelation of the bottom codes, or 1*1/30*1/30. Thus, there is nearly 60 dB of isolation between piconet IDs.

In the receiver, the ID code is correlated with the receiver's top code in order to recover the product of the bottom and middle codes. In order to use this technique, the top code itself should have a rather low degree of autocorrelation, or sharpness, such that the autocorrelation function has a wide peak, but the autocorrelation peak of the ID code is equal to the length of the top code.

One known series of codes that meets the criterion of having a low degree of autocorrelation is the so-called Walsh codes, which have a low autocorrelation and low crosscorrelation.

The serializer 58 receives the ID code and outputs a corresponding sequence of voltage pulses (+V for logic high, −V for logic low). The serializer supplies the voltage pulses to the amplifier 130, which drives the transmitter antenna 20. The transmitter antenna reconstructs a waveform that approximates the waveform of the sequence of voltage pulses provided by the serializer 58. The receiver antenna 22 provides a corresponding ID code signal to a correlator 144, which includes a top code correlator 148 and a lower code correlator 152.

Let us assume for a moment that the ID code signal provided by the receiver antenna 22 matches precisely the output signal of the serializer 58. The top code correlator 148 then receives a sequence of voltage pulses that precisely matches the sequence of voltage pulses provided by the serializer 58. The top code correlator compares the sequence of 16 binary chips forming the piconet's locally generated top code with successive groups of 16 consecutive voltage pulses in the ID code signal received from the receiver antenna 22, advancing through the sequence by one pulse at a time. If the top code correlator 148 detects a match between a group of 16 consecutive pulses and the top code, it implies that the locally generated top code is aligned in time within $1/R_{middle}$ with one of the positive repetitions of the top code in the ID code. The correlator may then advance through the sequence of voltage pulses in steps of 16 pulses and the correlation of the locally generated top code and each group of 16 consecutive voltage pulses will have a maximum value in the event that the corresponding chip of the lower code is +1 and a minimum value in the event that the corresponding chip of the lower code is −1. Thus, the output signal of the top code correlator 148 is the lower code.

Of course, the waveform of the signal received by the correlator 144 will not match precisely the waveform of the sequence of voltage pulses provided by the serializer 58, but any discrepancy between the waveforms affects the likely error in determining a match and this error can be kept acceptably small.

Referring again to FIG. 11, correlation with the top code is effected in the analog domain by multiplying the ID code signal received by the top code correlator 148 during an interval corresponding to 16 chips of the ID code, i.e. $1/R_{middle}$, with a signal generated by converting the 16 code chips of the top code to a sequence of antipodal voltage pulses and integrating the product signal over an interval of duration $1/R_{middle}$. Preferably, the top code correlator has 16 phases that multiply the top code pulse sequence concurrently with the ID code signal, both as received directly from the antenna and as delayed by each of 1–15 chip periods. Alternatively, fewer than 16 phases may be employed and the ID code signal delayed by a variable amount in order to determine the delay that provides the best correlation. In either case, a controller (not shown) selects the delay that provides the best correlation and the top code correlator supplies the correlation of the top code with the ID code signal delayed by the selected amount to the lower code correlator 152.

The output signal of the top code correlator is applied to the lower code correlator 152, which correlates the lower code signal with the locally generated middle code and bottom code. In the event that the lower code correlator finds that the sequence of top code matches in the signal provided by the top code correlator correlates positively with the middle code and that the sequence of middle code matches correlates positively with the bottom code, the lower code correlator provides an output signal that enables the complex mixer 24 and triggers the timing generator 48, which operate in conjunction with the DSP engine 64 in the manner described above to detect, demodulate and demap the symbols in the data portion of the packet.

It will be understood that the timing resolution of the top code correlator is equal to the period of the middle code, i.e. $1/(R_{middle})$. Accordingly, the timing generator is able to time the operation of the receiver with sufficient accuracy to extract the data from the data packet.

Identifying a match between the received signal chips and the top code involves a compromise between certainty of detecting the match and the timing accuracy of the match. If the crosscorrelation function has a narrow peak in the time domain, the timing of the sequence of received ID code chips relative to the top code can be determined with a high degree of accuracy, but there is a relatively high danger that the match will not be detected. Conversely, if the crosscorrelation function is rectangular over a substantial number of samples, there is little danger that the match will not be detected but it is not possible to calculate the timing of the sequence of received ID code chips with a high degree of accuracy.

In the event that the top code is a Walsh code, the cross-correlation function of the top code with the ID code has triangular lobes. Consequently, correlation of the top code with the ID code can potentially extract the timing of the ID code with a fairly high degree of accuracy. Conversely, in a practical implementation there is a rather high probability that the correlator will be unable to detect an occurrence of the top code in the ID code and therefore will not return a match. In a practical implementation, it is desirable that the correlator should detect a match with a high probability but it is not necessary that the correlation should indicate the timing of the ID code sequence with a high degree of accuracy.

Referring to FIG. 13, in a preferred embodiment of the invention the PN generator 110 generates two top codes, referred to as code A and code B. Let us assume that top code A is:

A=[−1 −1 +1 +1 −1 −1 +1 +1 +1 +1 −1 −1 +1 +1 −1 −1]

and top code B is:

B=[−1 +1 −1 +1 +1 −1 +1 −1 +1 −1 +1 −1 −1 +1 −1 +1]

Figure 13A:
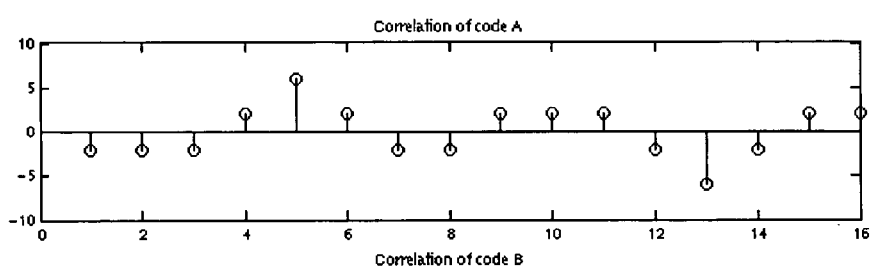
FIG. 13 is a graph that may be helpful in understanding operation of the FIG. 12 embodiment.
Figure 13B:
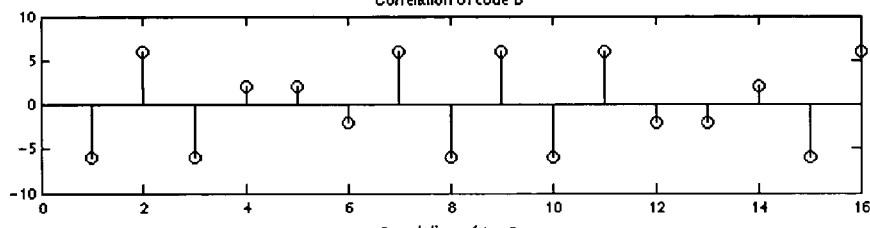
Figure 13C:
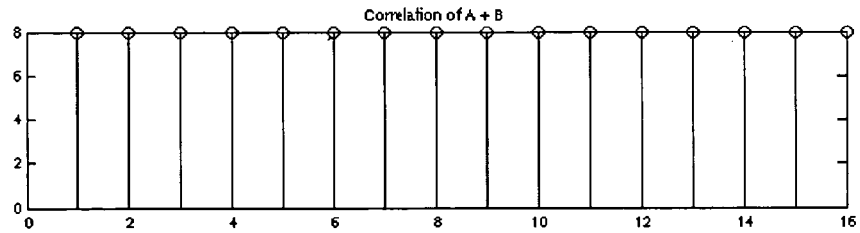

The autocorrelation function of top code A is shown in FIG. 13A and the autocorrelation function of top code B is shown in FIG. 13B. As in the case of FIG. 11, the multiplier 118 provides a lower code composed of a sequence of 31*64 intermediate code chips to a first input of the multiplier 122 at the rate $R_{middle}$. During each period $1/R_{middle}$, the 16 chips of top code A and the 16 chips of top code B are read out in parallel and the mean of each chip of code A and the corresponding chip of code B is supplied to the second input of the multiplier 122 as a ternary (+1, 0, −1) combined top code C. The transmitter transmits an analog signal representing the ID code bottom*middle*C.

We will now define code B*. Code B* is equal to code B delayed by half the length of the top code sequence. Thus, whereas code B is:

[−1 +1 −1 +1 +1 −1 +1 −1 +1 −1 +1 −1 −1 +1 −1 +1]

code B* is:

[+1 −1 +1 −1 −1 +1 −1 +1 −1 +1 −1 +1 +1 −1 +1 −1]

In the case of codes A and B defined above, the maximum of the autocorrelation function of code B* is aligned with the minimum of the autocorrelation function of code A.

It can be shown that the sum of the absolute value of the crosscorrelation function of code A with the ID code and the absolute value of the crosscorrelation function of code B* with the ID code has rectangular lobes. See FIG. 13C. Accordingly, the sum of the absolute value of the crosscorrelation function of code A with the ID code and the absolute value of the crosscorrelation function of the B* code with the ID code is constant and is not dependent upon achieving a specific timing relationship between codes A and B*, on the one hand, and the ID code on the other.

Figure 12:
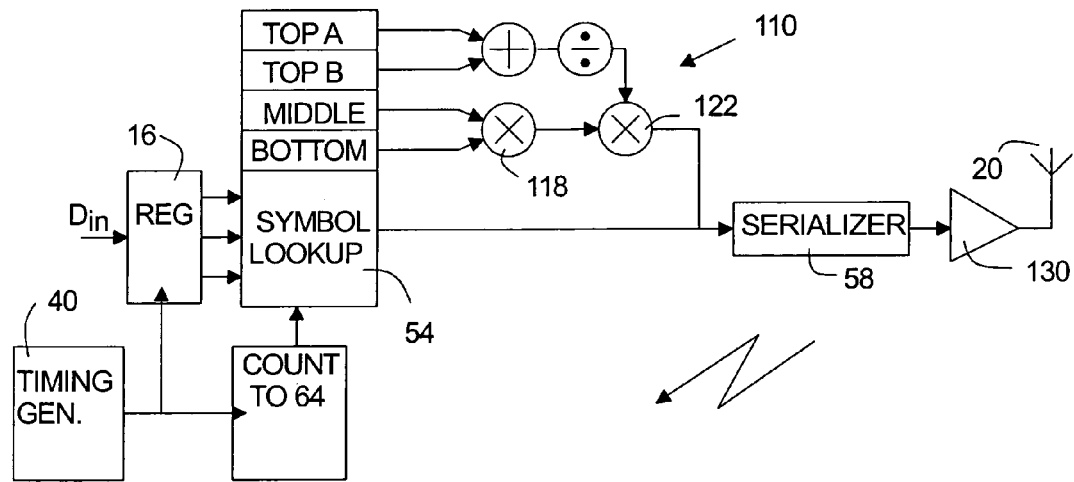
Figure 12:
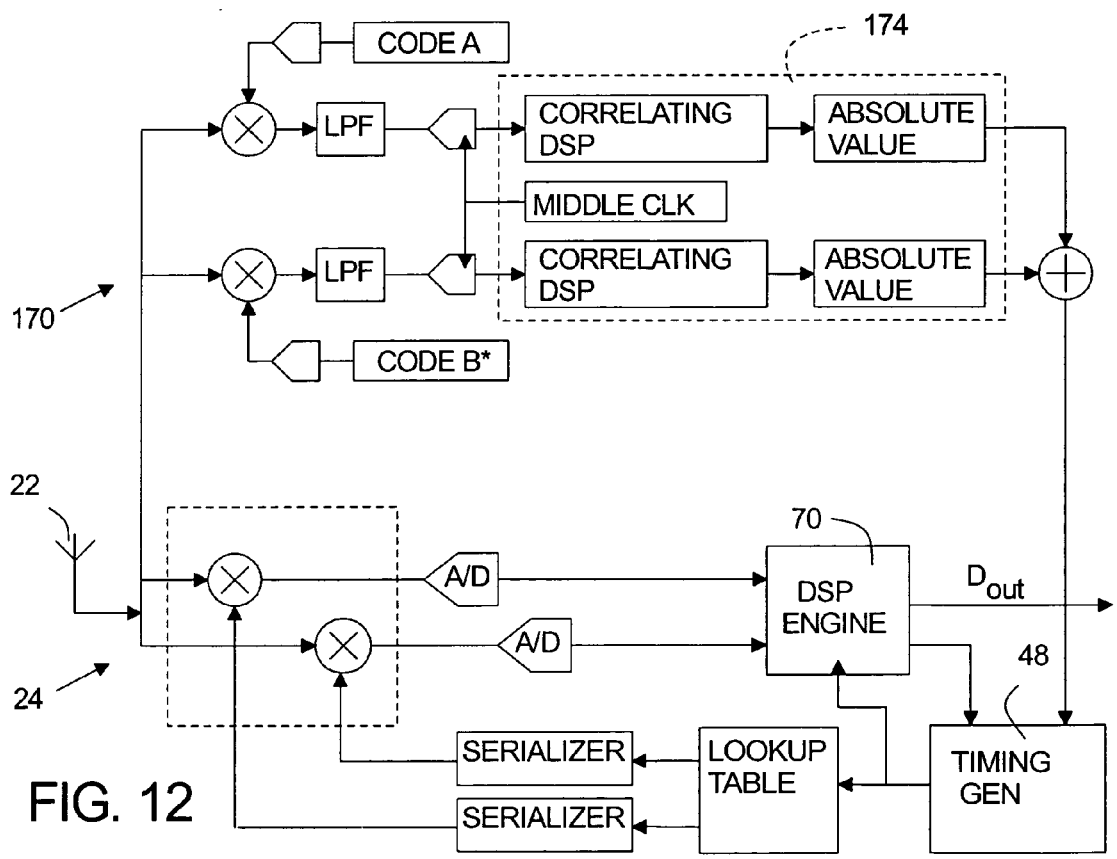

Referring again to FIG. 12, the analog antenna signal is supplied to a correlator 170 having a channel A and a channel B that multiply the signal with code A and code B* respectively. The analog product signals are converted to digital form at the rate $R_{middle}$ and the resulting digital product signals are supplied to a DSP engine 174 that correlates the product signals with the middle and bottom codes. The resulting signal has a waveform that varies with the correlation of the ID code and the codes A and B* respectively. The absolute values of the signals are calculated and in the event that the sum of the absolute values exceeds a threshold level, the correlator 170 enables the complex mixer 24 and triggers the timing generator 48, as described above. It will thus be seen that the correlator 170 effects a coarse, medium and fine correlation without adjusting the timing of the analog antenna signal relative to codes A and B*. The timing recovery circuit provides a coarse ($1/R_{middle}$) timing resolution. Fine timing is accomplished by comparison of the equalization sequence with locally generated replicas of the a priori codes.

It will be appreciated that instead of delaying code B* relative to code A in the receiver, it would instead be possible to advance code B relative to code A at the transmitter. Further, although FIG. 11 illustrates that relative delay between the top code and the ID code signal is effected by delaying the ID code signal, it would instead be possible to delay the top code signal. In addition, it would be possible to employ fewer phases of the top code correlator and iteratively adjust the delay in order to maximize the correlation.

Preferably the top code is a Walsh code. In the case of the FIG. 12 embodiment, codes A and B are preferably selected so that the frequency coverage of the two codes are offset and do not overlap unduly and the codes thus provide wide frequency coverage.

In the preferred implementation the complex mixer 24 is shared in time with the top code mixer of the correlator 170. Similarly, the A/D converters and other analog circuitry may be shared between the two functions of timing recovery and symbol recovery since the packet sync and data intervals do not overlap and have a guard interval between them for switching and settling.

The preferred embodiments of the invention provide a long repeat interval (the interval between transmissions in the same channel) relative to multipath delay, which eliminates or reduces intersymbol interference. Close symbol to symbol frequency spacing facilitates simultaneous processing of multiple receiver phases in the digital signal processing engine. However, in a line-of-sight application, where there was low multipath energy, close symbol to symbol spacing is not important and successive frequency channels need not be adjacent on a sawtooth but could be spaced in the frequency domain. In this case, both the transmitter and receiver could hop in the frequency domain in accordance with a predetermined plan. The implementation described with reference to FIG. 6 is particularly applicable to such a scheme, since the carrier frequency is synthesized based on the contents of the look-up table instead of by operation of a swept VCO.

It will be appreciated that the invention is not restricted to the particular eimbodiments that have been described, and that variations may be made therein without departing from the scope of the invention as defined in the appended claims and equivalents thereof. For example, although in each of the described embodiments of the invention the frequency of the carrier increases from channel to channel during the frequency sweep interval, it is necessary only that the channels be orthogonal and therefore it would be possible for the carrier frequency to vary from channel to channel in some other way, such as decreasing from channel to channel during the frequency sweep interval. In addition, although the foregoing description only refers to a single stairstep or sawtooth waveform, it would be possible for two or more stairstep or sawtooth waveforms to be interleaved, provided that they are spaced sufficiently to preserve orthogonality of the channels. Also, multiple sawtooth waveforms may be placed in tandem (one immediately following another) and transmit the same information so as to increase the power output without increasing the peak power level. In this case, successive channels of a first sawtooth transmit successively symbols S1, S2, S3, S4, etc. and successive channels of a second sawtooth, which is delayed by only one symbol interval relative to the first sawtooth, transmit successively symbols S1, S2', S3, S4', for example, where the prime designates complement. This spreading of the transmitter's energy in time also, due to the slope of the ramp, increases the transmitter's instantaneous bandwidth in order to comply with government regulations in some jurisdictions. The invention has been described with reference to 8-level phase shift keying, but it will be appreciated that the principles of operation are applicable to other modulation techniques also. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A radio transmitter that includes:
   a symbol look-up table for receiving an input data word as a first address word and for receiving a second address word that is a function of time, and for outputting at least one parallel digital data word,
   a means for converting said parallel data word to a digital sequence, and
   a means for reconstructing an analog signal from said digital sequence,
   wherein said digital sequence reflects both systematic variation of a carrier in frequency and modulation of the carrier in accordance with the data word, whereby said analog signal has a frequency that depends on said second address word and a phase that depends on said first address word.

2. A radio transmitter according to claim 1, wherein said analog signal has a fixed frequency for each value of said second address word.

3. A radio transmitter according to claim 1, wherein said analog signal varies in frequency over a fixed range for each value of said second address word.

4. A method of generating an identification code for a transmitter and receiver arrangement, comprising multiplying a first pseudo random sequence of p code chips sequentially by each chip of a second pseudo random sequence of q code chips to generate a sequence of p*q code chips in which the sequence of p code chips is reproduced once for each occurrence of a logic high value in the sequence of q code chips, and multiplying the sequence of p*q code chips by each chip of a third pseudo random sequence of r code chips to generate a sequence of p*q*r ID code chips in which the sequence of r code chips is reproduced once for each occurrence of a logic high value in the sequence of r code chips.

5. A method according to claim 4, wherein each code chip has a value selected from the group that includes logic high and logic low and the method comprises multiplying the code chips in accordance with a rule such that the product of logic high and logic high is logic high and the product of logic low and logic low is logic high.

6. A method according to claim 4, wherein at least one of the first and second sequences of code chips is a sequence of ternary chips.

7. A method according to claim 4, wherein at least one of the first and second sequences of code chips have values that are related in accordance with Gold, Kasami or m-sequence codes.

8. A method according to claim 4, wherein the third sequence of code chips is a sequence of binary chips.

9. A method according to claim 4, comprising generating the sequence of r code chips by adding a first sequence of r binary code chips and a second sequence of r binary code chips on a chip by chip basis in accordance with a rule such that the sum of logic high plus logic high is ternary high, the sum of logic low plus logic low is ternary low, and the sum of logic high plus logic low is ternary zero.

10. A method according to claim 9, wherein the autocorrelation coefficient of the first sequence of binary code chips has a maximum at a lag of u elements and the autocorrelation coefficient of the second sequence of binary code chips has a minimum at a lag of v elements, and the method comprises correlating an ID code signal, which represents the sequence of ID code chips at the receiver, with the first sequence and with the second sequence in a manner such that there is a time offset between the correlations at the receiver of the first and second sequences with the ID code signal.

11. A method according to claim 10, wherein the time offset is (u–v) elements.

12. A method according to claim 10, comprising forming the sum of the absolute value of the correlation of the ID code signal with the first sequence and the absolute value of the correlation of the ID code signal with the second sequence.

13. A method according to claim 9, wherein the first sequence of r binary code chips and the second sequence of r binary code chips each have values that are related in accordance with a Walsh code.

14. A method according to claim 4, comprising transmitting the sequence of p*q*r code chips from the transmitter and correlating a signal representing the transmitted sequence of p*q*r ID code chips at the receiver with a sequence of r code chips and thereby recovering the sequence of p*q code chips.

15. A method according to claim 4, wherein the third pseudo random sequence of code chips is a sequence of binary code chips having values that are related in accordance with a Walsh code.

16. A radio transmitter for transmitting digital data represented by symbols selected from a menu of symbols, wherein each symbol is characterized by at least one of phase and frequency, comprising a look-up table that stores a digital representation of each symbol, an addressing means for addressing the look-up table in accordance with a group of digital data digits, and a digital to analog converter for converting a selected symbol to analog form,
   wherein each symbol is characterized by phase and the look-up table stores a digital representation of each symbol at a plurality of frequencies, and the addressing means addresses the look-up table in accordance with a group of digital data digits and in accordance with a preselected sequence of frequencies.

17. A radio transmitter according to claim 16, wherein the addressing means addresses the look-up table in accordance with a cyclically repeating sequence of frequencies.

18. A radio transmitter that comprises a first means for generating a first electromagnetic carrier that varies in frequency as a periodic function of time, a second means for generating a second electromagnetic carrier that varies in frequency as a periodic function of time, wherein the period of the variation in frequency of the first carrier is substantially equal to the period of the variation in frequency of the second carrier, the range of the variation in frequency of the second carrier overlaps at least partially the range of the variation in frequency of the first carrier, and the variation in frequency of the first carrier is offset in time relative to the variation in frequency of the second carrier so that at a given instant in time the frequency of the second carrier is different from the frequency of the first carrier.

19. A radio transmitter according to claim 18, wherein the range of the variation in frequency of the second carrier is substantially equal to the range of the variation in frequency of the first carrier, the transmitter includes a means for resolving the period of the variation in frequency of the first carrier into a plurality of channel intervals of equal duration and a means for resolving the period of the variation in frequency of the second carrier into a plurality of channel intervals equal in duration to the channel interval of the first carrier, and the variation in frequency of the first carrier is offset in time relative to the variation in frequency of the second carrier by an integer multiple of one channel interval.

20. A radio transmitter that comprises a means for receiving an input data word and generating a digital sequence that reflects systematic variation of a carrier and modulation of the carrier in accordance with the data word, and a digital-to-analog converter for converting the digital sequence to analog form at a sample conversion rate such as to generate a bandpass signal that varies both systematically and in accordance with the data word;

wherein said digital sequence is composed of two component sequences and the digital to analog converter comprises first and second converters for converting the two component sequences respectively, a clock source for clocking the first and second converters, whereby the first and second converters generate first and second analog component signals respectively, a phase offset means for offsetting the clocking of the second converter in phase relative to the clocking of the first converter, and a summation circuit for combining said first and second analog component signals to produce said bandpass signal.

* * * * *